United States Patent [19]

Yamaguchi et al.

[11] Patent Number: 4,922,356
[45] Date of Patent: May 1, 1990

[54] TRANSDUCER SUPPORTING APPARATUS AND DISK STORAGE UNIT

[75] Inventors: Yuzo Yamaguchi, Tsuchiura; Yoshinori Takeuchi, Ibaraki; Yokuo Saitoh, Kanagawa; Hiroshi Daito; Hiroyasu Nakajima, both of Odawara; Yoshiakira Karakama, Hadano; Yukimori Umakoshi; Kazunori Hori, both of Odawara; Mikio Tokuyama, Tsuchiura, all of Japan

[73] Assignee: Hitachi, Ltd., Tokyo, Japan

[21] Appl. No.: 8,259

[22] Filed: Jan. 29, 1987

[30] Foreign Application Priority Data

Jan. 29, 1986 [JP] Japan .................. 61-15681

[51] Int. Cl.⁵ .............................. G11B 5/48
[52] U.S. Cl. .................... 360/104; 360/103
[58] Field of Search ............... 360/102, 103, 104, 105

[56] References Cited

U.S. PATENT DOCUMENTS 4,167,765 9/1979 Watrous ..................... 360/104 X
4,620,251 10/1986 Gitzendanner ............... 360/105 X

FOREIGN PATENT DOCUMENTS 0178649 10/1984 Japan ..................... 360/103
0221872 12/1984 Japan ..................... 360/104
0050777 3/1985 Japan ..................... 360/103
0050778 3/1985 Japan ..................... 360/103
0167172 8/1985 Japan ..................... 360/104
0074184 4/1986 Japan ..................... 360/103

Primary Examiner—A. J. Heinz
Assistant Examiner—Andrew L. Sniezek
Attorney, Agent, or Firm—Antonelli, Terry & Wands

[57] ABSTRACT

A transducer supporting apparatus is provided with a rigid structural support connected to a rigid arm portion and a flexible strucural support provided on the free end of the rigid structural support, the flexible structural support comprising two flexible fingers, a transverse frame connecting the two flexible fingers on the extending side thereof through steps, and a slider mounting portion having a tongue form which extends from this frame and is provided adjacent to the two flexible fingers and a slider loaded with a transducer being junctioned with the slider mounting portion. The flexible fingers are so configurated that the end thereof on the side of the rigid arm portion is brought nearer to the plane formed by the floating surface of the slider than the end thereof on the side of the slider mounting portion.

16 Claims, 5 Drawing Sheets

TRANSDUCER SUPPORTING APPARATUS AND DISK STORAGE UNIT

BACKGROUND OF THE INVENTION

1. Field of the Invention

The present invention relates to a transducer supporting apparatus for a rotary memory, and particularly to a transducer supporting apparatus which is suitable for a high-density memory wherein the transducer floatation amount is small and the search speed thereof is high.

2. Description of Prior Art

A rotary memory is provided with a rotating storage medium, a transducer for reading and writing information in the state of being floated above the storage medium, a transducer supporting apparatus such as the one disclosed, for example, in U.S. Pat. No. 4,167,765, for supporting the transducer, and an access mechanism for giving the transducer access to the storage medium and for supporting it at any desired position within the radius thereof. The transducer supporting apparatus is provided with a flexible structural support comprising a rectangular notch which forms two outer flexible fingers connected by means of a slightly-flexible transverse frame, a flexible central tongue which extends from the transverse frame to the notch, a rigid structural support for supporting the flexible structural support comprising an elastic portion and a load beam portion, and a projection for transmitting load interposed between the rigid structural support and the central tongue of the flexible structural support, the air bearing slider (referred to as "slider" hereinafter) loaded with the transducer being provided on the central tongue.

The transverse frame is formed into a solid form and the central tongue is substantially rigid because the slider is provided on the lower surface thereof and, consequently, the outer flexible fingers are the only substantially flexible portions of the flexible structural support. The outer flexible fingers are formed in parallel with the central tongue and thus in parallel with the plane formed by the floating surfaces of the slider.

During a search in which the transducer is given access to any radial position of the rotary medium, a radial driving force is applied to the transducer supporting apparatus from the access mechanism. This driving force effects acceleration, speed maintenance, or deceleration of the transducer supporting apparatus. In the above-described conventional transducer supporting apparatus, insufficient account has been taken of the phenomenon whereby when the driving force is applied, the slider rolls and thus reduces the floatation amount, as described below.

In other words, since there has been so far no means for precisely measuring any variation in the floatation amount with time at a high speed and, thus, of simultaneously measuring the changes of the floatation amounts of the right and left floating surfaces of the slider and detecting the rolling movement of the slider, it has not been possible to take the above-described phenomenon sufficiently into consideration. Here, "precise measurement" of the change in floatation amount at high speed means that a change in floatation amount of about 0.01 $\mu$m produced within a time 0.5 mS can be measured with a resolution of 0.05 mS to 0.1 mS and 0.005 $\mu$m or more.

Another reason for the fact that insufficient consideration has been given to reductions in floatation amount during search in the prior art is that the actual floatation amount is normally sufficiently large compared with the amount of any estimated reduction which takes place during the search. Namely, it has been previously thought that an ordinally floatation amount is 0.4 $\mu$m to 1 $\mu$m, while any reduction in the floatation amount is on the order of 0.01 $\mu$m to 0.03 $\mu$m and hence not critical factor. However, recent developments have led to the use of increasingly high levels of storage density and it has become necessary to reduce the floatation amount to the range of 0.2 $\mu$m to 0.3 $\mu$m. There is also nowadays a demand for search time to be reduced. Thus any reduction in the floatation amount during search becomes larger than the conventional amount, and hence it becomes necessary to take sufficient account of this reduction in floatation amount during the search.

A conventional concept with respect to the cause of a reduction in floatation amount during search will be described hereinafter.

When a force F in the search direction is transmitted to the slider from the flexible structural support, this force F has the tendency to rotate the slider around the center of mass G thereof. When the rotation of the slider is considered, it can be assumed that the point of application of the force F lies on the surface on which the slider is mounted. Therefore, if the distance between the force F and the center of mass G (an arm length) is $l_1$, its moment $M_G$ is $$M_G = F l_1 \ldots \quad (1)$$

The moment $M_G$ is in balance with a restoring moment $M_r$ which is produced by inclination of the slider by an angle i brought about by a change $\pm \Delta h$ in the floatation amount of the floating surfaces of the slider, and thus $$M_r = k\, i \ldots \quad (2)$$

wherein k denotes a restoring air bearing spring constant. Since $$\Delta h = l_2\, i \ldots \quad (3)$$

$$F = m\alpha \ldots \quad (4)$$

the above-described change $\Delta h$ can be expressed by the following formula:

$$\Delta h = m/k\, l_2\, l_1 \ldots \quad (5)$$

wherein m denotes the mass of the slider, $\alpha$ denotes the search acceleration and $l_2$ denotes the distance between the left and the right floating surfaces of the slider.

In order to confirm the correctness of the above-described concept, a means for measuring a change in the floatation amount of the floating surface of the slider with time was developed and changes $\Delta h$ relative to various masses m and arm lengths $l_1$ of the slider were measured during search of the transducer supporting apparatus. As a result, it was found that actually measured changes $\Delta h$ were very much larger than the value obtained from the formula (5). That is, when L represents a distance between the substantial point of application of the force F on the slider in the search direction and the center of mass G and $\Delta h$ is expressed by the following formula $$\Delta h = m\alpha / k\, l_2\, L \ldots \quad (6)$$

it is found that $$L > l_1 \ldots \quad (7)$$

This is described below in detail. It is found that any deformation of the outer flexible fingers greatly affects the magnitude of Δh. The reason is as follows. The center of mass G of the slider lies on the side of the storage medium relative to the outer flexible fingers. Thus, when an inertial force (F=mα) is applied to the slider by the search acceleration α, the outer flexible fingers are deformed in the direction in which the change Δh is further increased thereby.

In the conventional transducer supporting apparatus, as described above, insufficient account has been taken of the large distance between the substantial point of application of a force on the slider in the search direction and the center of mass G of the slider and there therefore has been a problem with respect to the large reduction in floatation amount which occurs during the search.

SUMMARY OF THE INVENTION

It is an object of the present invention to provide a transducer supporting apparatus in which the reduction in floatation amount of a slider and the possibility of contact between the slider and a storage medium are decreased.

It is another object of the present invention to provide a disk storage unit in which is integrated the above-described transducer supporting apparatus and the reliability of which during information writing in and reading therefrom is improved.

In the transducer supporting apparatus of the present invention, a flexible structural support on which a slider is provided is so configurated that the rigid structural support connection end of a substantially flexible portion thereof is brought near the plane which is formed by the floating surface of the slider relative to the slider-mounting portion end thereof.

A bending moment and a shear force act on the flexible portion of the flexible structural support by the search acceleration or search deceleration during a search. A change in floatation amount caused by any inclination of the flexible portion produced by this shear force functions in such a way that there is a decrease in the amount of reduction in the floatation amount caused by any inclination of the flexible portion generated by the angular moment. Thus, the overall reduction in the floatation amount of the slider is decreased during the search.

DETAILED DESCRIPTION OF PREFERRED EMBODIMENTS

Embodiments of the present invention will be described hereinafter with reference to the accompanying drawings.

Figure 1:
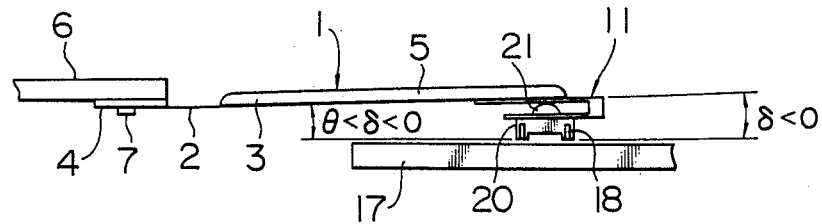
FIG. 1 is a side view of an embodiment of the transducer supporting apparatus of the present invention.
Figure 2:
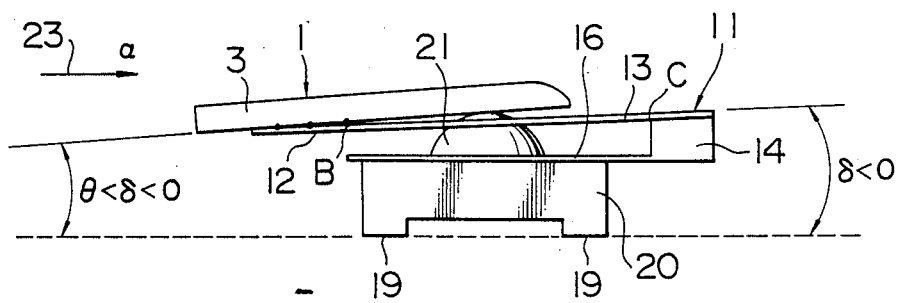
FIG. 2 is an enlarged side view of a principal portion of the apparatus shown in FIG. 1.

FIGS. 1 and 2 show a preferred embodiment of the present invention. A rigid structural support 1 made of a single piece of stainless sheet comprises, for example, an elastic portion 2 and a load beam portion 3 which ranges with the elastic portion 2 and is provided with a flange 5 as a load beam bending portion. The rigid structural support is integrally formed, for example, by press working and is fixed to a guide arm 6, which is a kind of rigid arm connected to an access mechanism (not shown), at a connection portion 4 disposed at one end of the elastic portion 2 by means of a screw 7 or welding.

Figure 3:
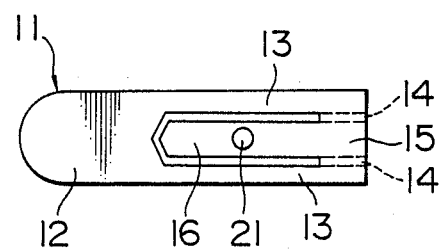
FIG. 3 is a plan view explaining in detail the flexible structural support of the apparatus in FIG. 1.

A flexible structural support 11 is fixed at the end of the load beam portion 3 of the rigid structural support 1, that is, the free end of the rigid structural support 1, by welding. FIG. 3 is a plane view of an embodiment of the flexible structural support 11. The flexible structural support 11 is provided with a junction portion 12 which serves to provide a junction with the rigid structural support 1, two flexible fingers 13 which extend from this junction portion 12 on the same plane and in the opposite direction to that of the guide arm 6, a transverse frame 15 which connects the extending ends of the two flexible fingers 13 through a step 14, and a slider mounting portion 16 in the form of a tongue which is provided near the two flexible fingers 13 and which extends from the transverse frame 15. These are formed, for example, by etching a single piece of stainless sheet and the step 14 is formed by press working. This slider-mounting portion 16 is brought nearer the side of the storage medium 17 by providing the step 14.

A slider 20 which is loaded with a transducer 18, has two floating surfaces 19, and a transducer loading means is fixed to the above-described transducer-mounting portion 16 by means of an epoxy resin adhesive.

Since the slider 20 has the floating surfaces 19 opposing to the storage medium 17, it is floated by virtue of the bearing function of the air film which is formed between the rotating storage medium 17 and the floating surfaces 19. The floatation amount, i.e. the space between the slider 20 and the storage medium 17, is as small as 0.2 μm to 0.3 μm. However, since in practice the storage medium has coarseness on the surface thereof and projections on the order of about 0.15 μm, the above-described floatation amount sometimes becomes, in the worst case, about 0.05 μm to 0.15 μm.

A projection for transmitting load 21 is adapted to transmit a load force from the free end of the rigid structural support 1 to the slider-mounting portion 16. Either one of the opposed surfaces of the slider-mounting portion 16 and the free end of the rigid structural support 1 is provided with this projection 21. In this embodiment, the projection for loads 21 is formed in a recess provided in the slider-mounting portion 16.

FIG. 2 is a side view showing in detail the correlation between the slider 20 and rigid structural support 1 and the flexible structural support 11 of the load beam 3 in the state of being mounted on a rotary memory. In this embodiment, flexible finger 13 on the side of the junction portion 12 with the rigid structural support is nearer the plane formed by the floating surface 19 than an end C on the side of the slider-mounting portion thereof. At this time, an angle δ formed by the flexible finger 13 and the plane formed by the floating surface 19 is made negative. Additionally, in this embodiment, an angle θ formed by the load beam 3 and the plane formed by the floating surfaces 19 is even more negative than the above-described angle δ, as shown in the drawing. After taking into account the normal form of a slider, the assembly structural of a transducer supporting apparatus, and the assembly structural of a storage medium, this angle δ becomes $-2.0° < δ < 0°$, preferably $-1.5° < δ < -0.5°$.

Figure 4:
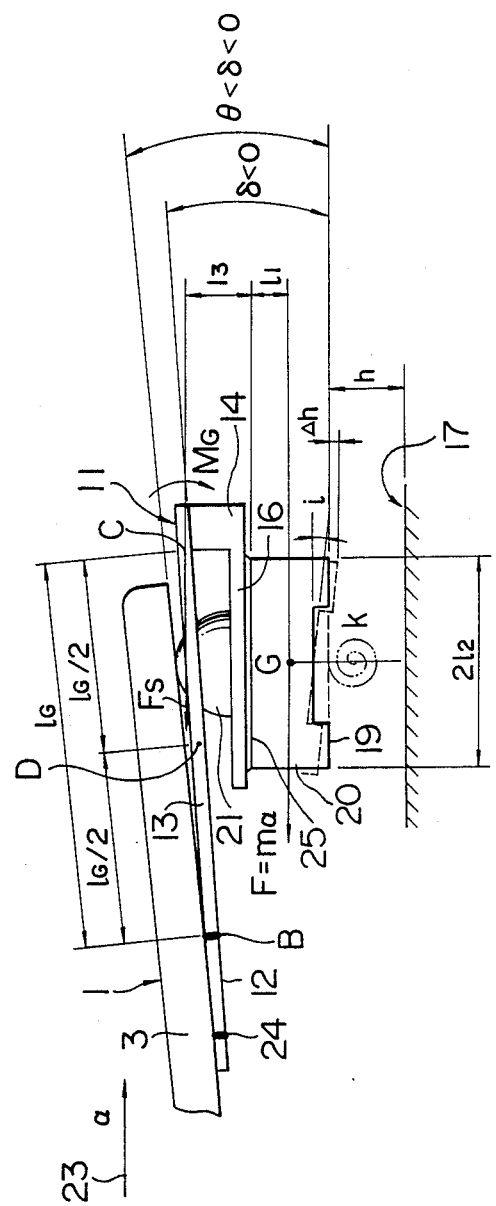
FIG. 4 is an explanatory view of the operation of the embodiment of the present invention shown in FIG. 1.

FIG. 4 is a drawing explaining the operation of this embodiment which shows parameters relative to the side view of the slider 20, the flexible structural support 11, and the rigid structural support 1. The operation during the search operation by the transducer supporting apparatus at an acceleration rate α in the radial direction shown in the drawing by the arrow 23 will be now described. When the transducer supporting apparatus moves in the direction shown by the arrow 23 at the acceleration α, the inertial force F=ma0 acts on the center of mass G of the slider 20 in the direction shown in the drawing. Since the rigidities of the slider 20, the adhesive layer 25, the slider-mounting portion 16, the step 14, and the load beam 3 are sufficiently large relative to that of the flexible fingers 13, it can be said that the only substantially flexible portion which is deformed by the inertial force F is the flexible fingers 13 having a length $l_G$ from a point B to a point C. The point B may be considered as the welding point nearest the projection for loads 21 among the welding points 24 on the load beam 3 of the rigid structural support 1 and on the junction portion 12 of the flexible structural support 11, which the point C may be considered as the edge of the flexible fingers 13 on the side of the step 14. The deformation of the flexible finger 13 will now be determined. The force being applied on the flexible fingers 13 comprises a shear force $F_S$ and a bending moment $M_G$ which are respectively shown by the formulas (8) and (9), and an inclination $i_c$ of the flexible finger 13 at the point C may thus be as shown by the formula (10).

$$F_S = mα \quad \ldots \quad (8)$$

$$M_G = mα(l_1 + l_3) - ki \quad \ldots \quad (9)$$

$$i_c = i_s + i_m \quad \ldots \quad (10)$$

wherein $i_s$ denotes the inclination of the flexible finger 13 brought about by the shear force $F_S$ at the point C, and $i_m$ denotes the inclination of the flexible finger 13 caused by the bending moment $M_G$ at the point C. They are shown below by the formulas (11) and (12), respectively, $$i_s = \frac{mα \sin δ \, l_G^2}{2EI_G} \quad (11)$$

$$i_m = \frac{l_G}{EI_G}[mα(l_1 + l_3) - ki] \quad (12)$$

wherein i denotes the inclination in the rolling direction of the slider 20 when an initial minimum flotation amount h of the floating surface 19 of the slider 20 is changed by Δh by virtue of the movement of the transducer supporting apparatus at the acceleration α, and k denotes the restoring spring constant of the air bearing function. As described before, any deformation from the point C to the point G can be disregarded, and thus $$i_c = i \quad \ldots \quad (13)$$

Therefore, any reduction in flotation amount Δh produced by the search may be expressed by the formula (14).

$$Δh = l_2 \frac{1}{1 + \frac{l_G}{EI_G}k} \left[ \frac{mα l_G}{EI_G}\left(l_1 + l_3 + \frac{l_G}{2}\sin δ\right)\right] \quad (14)$$

wherein E, $I_G$, and δ are respectively the Young's modulus of longitudinal elasticity of the flexible finger 13, the moment of inertia of the cross section thereof, and the angle formed by the flexible finger 13 and the plane formed by the floating surface 19 of the slider. When the formula (15) is considered $$\frac{k l_g}{EI_G} \gg 1 \quad (15)$$

Δh may be expressed approximately by the formula (16):

$$Δh = \frac{mα l_2}{k}\left(l_1 + l_3 + \frac{l_G}{2}\sin δ\right) \quad (16)$$

In this embodiment, the point B is nearer the plane formed by the floating surface 19 of the slider 20 than the point C so that the deformation $i_s$ produced by the shear force cancels the deformation $i_m$ by the moment.

This phenomenon is described below in detail with reference to the above formula (16).

If any change in floatation amount caused by the inclination $i_s$ by the shear force $F_S$ is denoted by $Δh_s$, the change $Δh_s$ may be expressed as follows:

$$Δh_s = \frac{mα l_2}{k} \cdot \frac{l_G}{2} \cdot \sin δ \quad (17)$$

If a reduction in floatation amount caused by an inclination $i_m$ produced by the moment $M_G$ is denoted by $Δh_m$, the reduction $Δh_m$ may be expressed as follows:

$$Δh_m = \frac{mα l_2}{k}(l_1 + l_3) \quad (18)$$

In this embodiment, the point B is nearer the plane formed by the floating surface 19 of the slider 20 than the point C so that the above-described angle δ is $δ < 0$. Therefore, $Δh_s$ is negative and cancels $Δh_m$ and, thus, it is possible to obtain the effect of a decrease of Δh. This effect means that it is possible to decrease the possibility of contact between the slider 20 and the storage medium 17 and to obtain a memory with high reliability.

Figure 5:
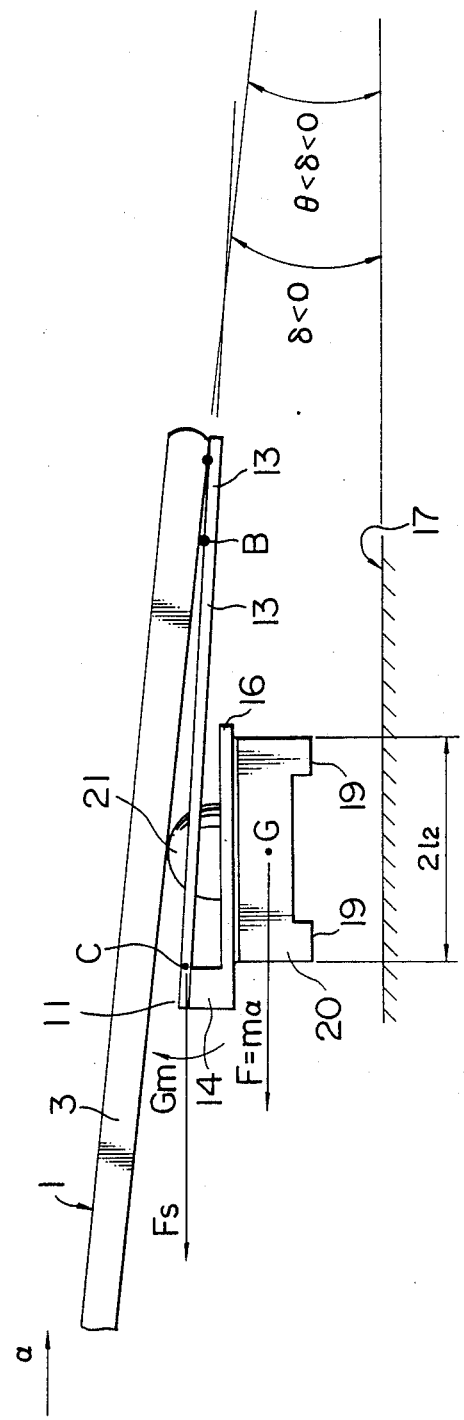
FIG. 5 is an enlarged side view of a principal portion of another embodiment of the transducer supporting apparatus of the present invention.

FIG. 5 is a side view of a principal portion of another embodiment of the present invention. A flexible structural support 11 is fixedly provided on the end of a load beam 3 of a rigid structural support 1, i.e. the free end of the rigid structural support 1, by welding. This flexible structural support 11 has a similar structure to that of the embodiment described in FIGS. 1 to 4, but the welding position of a junction portion 12 is at the top of the load beam 3. Two flexible fingers 13 are so disposed that they extend from this junction portion 12 toward a guide arm 6 (not shown). A projection for loads 21 is adapted to transmit a load force from the rigid structural support 1 to a slider-mounting portion 16. During the search operation, the force from the access mechanism is transmitted via a connection portion 4 and the rigid structural support 1 to the above-described junction portion 12 at the top of the load beam 3. This consideration also can result in an end B of the flexible finger 13 on the side of the junction portion 12 being nearer the plane formed by the floating surfaces 19 of the slider 20 than an end C of the flexible finger 13 on the side of a slider-mounting portion 16, whereby it is possible to obtain a similar effect to that of the embodiment shown in FIGS. 1 to 4. Such a support structure as shown in FIG. 5 may be applied to a structure in which the rigid structural support 1 is inclined with respect to a storage medium from the connection portion 4 through to the free end at the top.

The only substantially flexible portion of the flexible structural support 11 is the flexible fingers 13 and the points B and C are thus located at both ends of the flexible fingers 13. However, if the flexible fingers 13 are so configurated that the cross sectional dimension of the flexible fingers on the side of the junction portion 12 becomes smaller than that on the side of the step 14, the only substantially flexible portion even in the flexible fingers 13 is a portion having a small cross sectional dimension.

Thus, when the flexible fingers 13 are so configurated that this portion having a small cross sectional dimension is curved upwardly relative to the slider-mounting portion 16, the above-described point B lies at the point where the upward curve starts and can be made nearer to the plane formed by the floating surface 19 of the slider 20 than the point C.

Although in the above description, the angles $\delta$ and $\theta$ are made negative and conform to the inequality $\theta < \delta$, they may be the same. However, it is important that they may be made negative, as mentioned in the above-described definition.

Furthermore, in the above description, the angles $\delta$ and $\theta$ are angles with respect to the plane formed by the floating surfaces 19 of the slider 20. However, when the plane formed by the slider-mounting portion 16 of the flexible structural support 11 is substantially parallel with the plane formed by the floating surfaces 19 of the slider 20, they may be considered as an angle with respect to the slider-mounting portion 16.

As described above, the search includes driving forces effecting acceleration, speed maintenance, or deceleration of the transducer supporting apparatus and although the above description references the acceleration portion of the search, it is also applicable to the deceleration portion of the search.

The effect of the transducer supporting apparatus of the present invention will be explained by comparison with a conventional transducer supporting apparatus with reference to FIG. 6.

A high density disk storage unit having a floatation amount, i.e. a space between the slider 20 and the storage medium 17, of 0.37 $\mu$m is described below as an example.

Firstly, the meaning of the above-described floatation amount is considered from the viewpoints of the vibration and the manufacturing tolerance in regard to the slider and of the surface coarseness and the longitudinal movement of the disk storage unit which is the storage medium.

This floatation amount is obtained by averaging the time average values of the minimum spaces between the sliders and the disk for a great number of sliders produced in large amounts. The minimum value of the instantaneous floatation amount for a particular slider to be actually used will become smaller than the above average value of the floatation amount due to manufacturing errors occurring with each of many sliders, assembly tolerance, and various external forces which acts on a transducer supporting system when it is driven.

The phenomenon of depression of floatation amount during search which is the object of the present invention is also caused by a force acting in the search direction which is one of the external forces acting on the transducer supporting system.

The minimum instantaneous floatation amount of a slider may become about 0.2 to 0.3 $\mu$m due to causes other than the external forces acting in the search direction, as described above. On the other hand, the magnetic disk has surface deformations and surface coarseness produced during assembly, whereby the floatation amount is decreased and it may become as small as about 0.05 to 0.15 $\mu$m in the worst case even if depression due to the external forces acting in the search direction is disregarded.

On the other hand, a memory is required to rapidly respond to a read/write command from the system.

For a rapid response, it is necessary to reduce search time so as to be able to rapidly reach a desired track position on the magnetic disk. It is necessary for this reduction in search time to enable an increase in the search acceleration.

Since the search acceleration is in inverse proportion to the second power of the search time t, if a proportional constant is k', $$\alpha = k' \frac{1}{t^2}. \tag{19}$$

Figure 6:
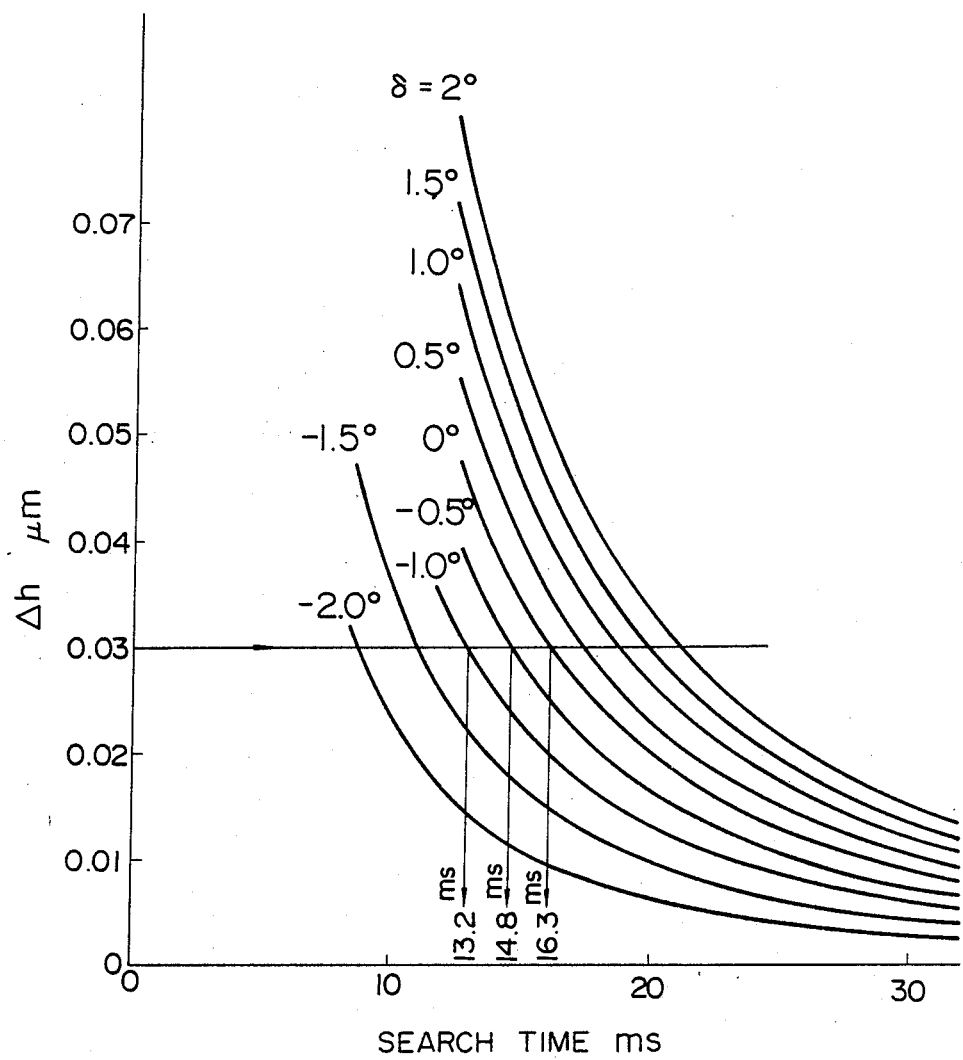
FIG. 6 is a drawing illustrating the effect of the present invention.

FIG. 6 shows the relationship between the search time (ms) and the reduction in the floatation amount $\Delta h(\mu m)$ produced by the search, which is obtained from the formulas (16) and (19), using the angle $\delta$ formed by the flexible finger of the flexible structural support and the plane formed by the floating surface as a parameter. In this drawing, the axis of abscissa is the search time t(ms) and the axis of ordinate is the reduction in the floatation amount $\Delta h(\mu m)$. As seen from FIG. 6, if the search acceleration is increased and the search time is decreased, $\Delta h$ is increased. However, if the search time is the same, $\Delta h$ decreases as the angle $\delta$ decreases.

In a memory, the search time is an important factor for its qualities and it is demanded for qualities that the search time is reduced just only by 1 ms.

During the search, the allowance of the space between the slider and the magnetic disk is about 0.05 to 0.15 $\mu$m, as described above. Now, if $\Delta h$ is 0.03 $\mu$m which is smaller than 0.05 $\mu$m for the sake of safety the search time is required to be 16.3 ms or more in order that $\Delta h$ does not become larger than 0.03 $\mu$m in the case of $\delta \geq 0°$. While in the case of $\delta \geq 0°$ as required in the present invention, the search time t may be below 16.3 ms in order that $\Delta h$ does not become larger than 0.03 $\mu$m. For example, if $\delta = -0.5°$, t=14.8 ms and if $\delta = -1.0°$, t=13.2 ms. This means the fact that the response time to a read/write command from the system can be greatly reduced and the memory is enabled to be accelerated.

Figure 7:
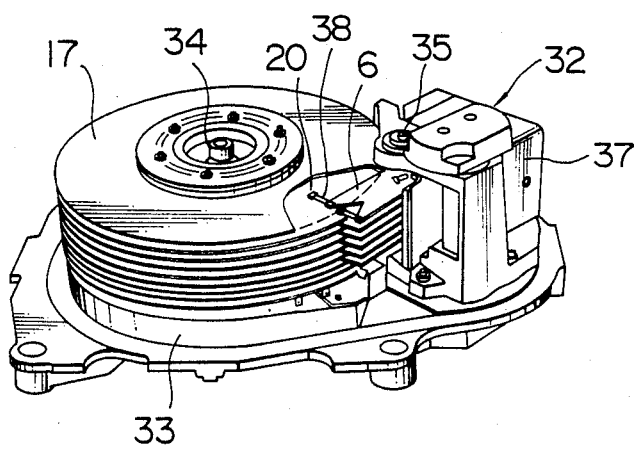
FIG. 7 is a perspective view showing a disk storage unit in which the transducer supporting apparatus is integrated.

FIG. 7 is a drawing showing a disk storage unit in which the transducer supporting apparatus of the present invention is integrated.

The disk storage unit is provided with magnetic disks 17 having a rotating disk form and the access mechanism 32 for giving the transducer a search motion so that information is written in the desired track on the magnetic disk and written information is read therefrom, they being arranged on a base 33. A plurality of the above-described magnetic disks 17 are fixed to a rotational spindle 34, for example, at distances of about 5 to 8 mm.

The access mechanism 32 comprises a plurality of guide arms 6 supported by a shaft 35 in such a manner that they can swing and a voice coil motor 37 for swing the guide arms 6.

The guide arms 6 are so provided as to correspond to the magnetic disks 17 and the transducer supporting apparatus 38 of the present invention is bonded to the top end of the arms.

The guide arms 6 are swinged along the disk surfaces of the magnetic disks 17 by driving the above-described voice coil motor 37. Consequently, the transducer supporting apparatus provided with the slider 20 loaded with a transducer at its top is inserted between the magnetic disks 17. The transducer writes and reads information while the slider 20 loaded with the transducer floats at a small distance of 0.2 to 0.3 $\mu$m relative to the magnetic disks 17 which rotate at a peripheral speed of 40 to 60 m/s.

The transducer supporting apparatus 38, as shown in FIGS. 1 to 5, is provided with the rigid structural support 1 which is fixed to a guide arm 6 and the flexible structural support 11 connected to the free end of the rigid structural support 1. The flexible structural support 11 is so configurated that the end B on the side of the junction portion 12 of the flexible finger 13 is brought nearer the plane formed by the floating surface 19 of the slider 20 than the end C on the side of the slider-mounting portion and the angle $\delta$ formed by the flexible fingers and the plane formed by the floating surface 19 is made negative. Although the optimum value of this angle $\delta$ is changed by the normal form of the slider 20, the assembly structure of the transducer supporting apparatus 38, and the distance between the magnetic disks, the angle is preferably $-2.0° < \delta < 0°$, and particularly $-1.5° < \delta < -0.5°$ from the viewpoint mentioned above.

If the angle $\delta$ is in the above-described range, the magnetic disks may be integrated at distances of about 5 to 8 mm which is employed in a high-density disk storage unit.

We claim:

1. A transducer supporting apparatus comprising a rigid arm portion which is connected to an access mechanism; a substantially rigid structural support which is provided on said rigid arm portion and comprises an elastic portion adjacent to said rigid arm portion and a load beam portion extending from said elastic portion and serving to apply a load force proximate to a free end thereof; a flexible structural support provided proximate to said free end of said substantially rigid structural support, said flexible structural support comprising two flexible fingers attached at one end portion thereof to said substantially rigid structural support and extending in a direction along the length of said substantially rigid structural support so as to terminate in free ends, a frame member connecting said two flexible fingers at the free ends thereof, and a mounting tongue portion having a surface connected to and extending from said frame member in one of a direction toward and away from said rigid arm portion at a position spaced below a plane in which said two flexible fingers lie and terminating in a free end, said flexible structural support being configured so that the one end portion of said flexible fingers is closer to a plane formed by said surface of said mounting tongue portion than the free ends of said flexible fingers proximate to said frame member; and a load transmitting projection interposed between said substantially rigid structural support and said mounting tongue portion of said flexible structural support and which serves to transmit a load force to said mounting tongue portion from said free end of said substantially rigid structural support.

2. A transducer supporting apparatus according to claim 1 characterized in that said flexible structural support is junctioned with said free end of said substantially rigid structural support at a junction portion and said flexible fingers are extended from said junction portion in the direction away from said rigid arm portion.

3. A transducer supporting apparatus according to claim 2 characterized in that lines extending from said flexible fingers in the direction away from said rigid arm portion are closer to said plane formed by said mounting tongue portion than a line extending from said substantially rigid structural support.

4. A transducer supporting apparatus according to claim 1 characterized in that said flexible structural support is junctioned with said free end of said substantially rigid structural support at a junction portion and said flexible fingers are extended from said junction portion in the direction toward said rigid arm portion.

5. A transducer supporting apparatus according to claim 4 characterized in that lines extending from said flexible fingers in the direction toward said rigid arm portion are closer to said plane formed by said mounting tongue portion than a line extending from said substantially rigid structural support toward said rigid arm portion.

6. A transducer supporting apparatus comprising a rigid arm portion which is connected to an access mechanism; a substantially rigid structural support which is provided on said rigid arm portion and comprises an elastic portion adjacent to said rigid arm portion and a load beam portion extending from said elastic portion and serving to apply a load force at a free end thereof; a flexible structural support which is provided proximate to said free end of said substantially rigid structural support, said flexible structural support comprising two flexible fingers attached at one end portion thereof to said substantially rigid structural support and extending in a direction along the length of said substantially rigid structural support so as to terminate in free ends, a frame member at the free ends thereof, and a mounting tongue portion connected to and extending from said frame member in one of a direction toward and away from said rigid arm portion at a position spaced below a plane in which said two flexible fingers lie and terminating in a free end, a transducer loading means being connected to said mounting tongue portion and including a floatation surface opposing a storage medium, said flexible structural support being configured so that the one end portion of said flexible fingers is closer to a plane formed by said floatation surface of said transducer loading means than the free ends thereof proximate to said frame member; and a load transmitting projection interposed between said substantially rigid structural support and said mounting tongue portion of said flexible structural support serves to transmit a load force to said mounting tongue portion from said free end of said substantially rigid structural support.

7. A transducer supporting apparatus according to claim 6 characterized in that said flexible structural support is junctioned with said free end of said substantially rigid structural support at a junction portion and said flexible fingers are extended from said junction portion in the direction away from said rigid arm portion.

8. A transducer supporting apparatus according to claim 7 characterized in that lines extending from said flexible fingers in the direction away from said rigid arm portion are closer to said plane formed by said floatation surface of said transducer loading means than a line extending from said rigid structural support.

9. A transducer supporting apparatus according to claim 6 characterized in that said flexible structural support is junctioned with said free end of said substantially rigid structural support at a junction portion and said flexible fingers are extended from said junction portion in the direction toward said rigid arm portion.

10. A transducer supporting apparatus according to claim 9 characterized in that lines extending from said flexible fingers in the direction toward said rigid arm portion are closer to said plane formed by said floatation surface of said transducer loading means than a line extending from said substantially rigid structural support toward said rigid arm portion.

11. A disk storage unit comprising a plurality of magnetic disks having a rotating disk form, an access mechanism including a rigid arm portion for positioning a transducer which serves to write information in said magnetic disks and read the written information therefrom, and a transducer supporting means which is connected to said rigid arm portion of said access mechanism and which serves to support a transducer loading means, said transducer supporting means comprising a substantially rigid structural support which comprises an elastic portion adjacent to said rigid arm portion and a load beam portion extending from said elastic portion and serving to apply a load force at a free end thereof; a flexible structural support provided proximate to said free end of said substantially rigid structural support, said flexible structural support comprising two flexible fingers attached at one end portion thereof to said substantially rigid structural support and extending along the length of said substantially rigid structural support so as to terminate in free ends, a frame member connecting said two flexible fingers at the free ends thereof, and a mounting tongue portion connected to and extending from said frame member in one of a direction toward and away from said rigid arm portion at a position spaced below a plane in which said two flexible fingers lie and terminating in a free end, said transducer loading means connected to said mounting tongue portion and including a flotation surface opposing one of said magnetic disks, said flexible structural support being so configured that the one end portion of said flexible fingers is closer to a plane formed by said floatation surface of said transducer loading means than the free ends of said flexible fingers proximate to said frame member; and a load transmitting projection interposed between said substantially rigid structural support and said mounting tongue portion of said flexible structural support and serves to transmit a load force to said mounting tongue portion from said free end of said substantially rigid structural support.

12. A disk storage unit comprising a rotating storage medium, an accessing mechanism for positioning a transducer to enable writing information in said rotating storage medium and reading written information therefrom, and a transducer supporting apparatus connected to said accessing mechanism, said transducer supporting apparatus including:
a substantially rigid structural support mounted on said accessing mechanism and including a free end,
a flexible structural support including flexible fingers connected at one end portion thereof to said substantially rigid structural support and terminating in a free end portion, and
a transducer loading means mounted on said free end portion of said flexible fingers so as to extend below a plane in which said flexible fingers lie and including a floatation surface opposing said storage medium,
said flexible fingers being configured so that said one end portion thereof is closer to a plane defined by said floatation surface of said transducer loading means than said free end portion of said flexible fingers.

13. A transducer supporting apparatus comprising:
an accessing mechanism for positioning a transducer with respect to a storage medium;
a substantially rigid structural support connected to said accessing mechanism and having a free end;
a flexible structural support including flexible fingers connected at one end portion thereof to said free end of said substantially rigid structural support and terminating in a free end portion; and
a transducer loading means mounted on said free end portion of said flexible fingers so as to extend below a plane in which said flexible fingers lie and including a floatation surface facing the storage medium,
said flexible fingers being configured so that said one end portion is closer to a plane defined by said floatation surface of said transducer loading means than said free end portion of said flexible fingers.

14. A disk storage unit comprising a rotating storage medium, an accessing mechanism for positioning a transducer to enable writing information in said rotation storage medium and reading written information therefrom, and a transducer supporting apparatus connected to said accessing mechanism, said transducer supporting apparatus including:
a substantially rigid structural support mounted on said accessing mechanism and including a free end,
a flexible structural support including flexible fingers connected at one end portion to said free end of said substantially rigid structural support and terminating in a free end portion, and
a transducer loading means mounted on said free end portion of said flexible fingers so as to extend below a plane in which said flexible fingers lie and including a floatation surface facing said storage medium,
said flexible fingers being configured so that said free end portion thereof is farther from said floatation surface of said transducer loading means than from a plane parallel to said floatation surface and transducer loading means, said one end portion of said extending through a center of gravity of said flexible fingers being closer to a plane defined by said floatation surface of said transducer loading means than said free end portion of said flexible fingers.

15. A transducer supporting apparatus comprising:
an accessing mechanism for positioning a transducer with respect to a storage medium,
a substantially rigid structural support connected to said accessing mechanism and having a free end;
a flexible structural support including flexible fingers connected at one end portion thereof to said free end of said substantially rigid structural support and terminating in a free end portion; and
a transducer loading means mounted on said free end portion of said flexible fingers so as to extend below a plane in which said flexible fingers lie and including a floatation surface facing the storage medium;
said flexible fingers being configured so that said free end portion of said flexible fingers is farther from said floatation surface of said transducer loading means than from a plane parallel to said floatation surface and extending through a center of gravity of said transducer loading means, said one end portion of said flexible fingers being closer to a plane defined by said floatation surface of said transducer loading means than said free end portion of said flexible fingers.

16. A transducer supporting apparatus comprising a rigid arm portion; and a substantially rigid structural support provided on said rigid arm portion and having a free end; means forming a flexible structural support provided proximate to said free end of said substantially rigid structural support and having a free end portion; means for loading a transducer being connected to said flexible structural support means and including a floatation surface disposed for facing a storage medium; said flexible structural support means including flexible fingers connected to said substantially rigid structural support and a mounting tongue portion connected to and disposed below said flexible fingers and extending in a plane which is non-parallel to a plane in which said flexible fingers lie, said flexible structural support means being configured so that when said transducer loading means is at least one of accelerated and decelerated and an inertia force acting on said transducer loading means generates a shearing force and a moment applied to said free end portion of said flexible structural support means, an inclination of said floatation surface of said transducer loading means with respect to the storage medium due to flexure of said flexible structural support means by the shearing force is opposite in direction to an inclination of said floatation surface of said transducer loading means with respect to the storage medium due to flexure of said flexible structural support means by the moment, thereby enabling decrease of a floatation amount of said transducer loading means with respect to the storage medium.

* * * * *